(12) United States Patent
Yoshida

(10) Patent No.: US 9,216,549 B2
(45) Date of Patent: Dec. 22, 2015

(54) OPTICAL PART MANUFACTURING METHOD, MOLD MANUFACTURING METHOD, OPTICAL PART MANUFACTURING APPARATUS, AND MOLD MANUFACTURING APPARATUS

(75) Inventor: Kunio Yoshida, Kanagawa (JP)

(73) Assignee: AJI Co., ltd., Kanagawa (JP)

( * ) Notice: Subject to any disclaimer, the term of this patent is extended or adjusted under 35 U.S.C. 154(b) by 178 days.

(21) Appl. No.: 12/812,168

(22) PCT Filed: Nov. 28, 2008

(86) PCT No.: PCT/JP2008/071694
§ 371 (c)(1),
(2), (4) Date: Jul. 8, 2010

(87) PCT Pub. No.: WO2009/093382
PCT Pub. Date: Jul. 30, 2009

(65) Prior Publication Data
US 2010/0289163 A1 Nov. 18, 2010

(30) Foreign Application Priority Data
Jan. 21, 2008 (JP) .................. 2008-010838

(51) Int. Cl.
*B29D 11/00* (2006.01)
*B29C 43/02* (2006.01)
(Continued)

(52) U.S. Cl.
CPC ........ *B29D 11/00278* (2013.01); *B29C 43/021* (2013.01); *G02B 3/0031* (2013.01); *G02B 3/0075* (2013.01); *G02B 7/021* (2013.01);
(Continued)

(58) Field of Classification Search
CPC .................................................. B29D 11/00278
USPC ........................................................... 264/2.5
See application file for complete search history.

(56) References Cited

U.S. PATENT DOCUMENTS

| 2005/0162733 A1* | 7/2005 | Cho et al. ...................... 359/361 |
| 2006/0176583 A1* | 8/2006 | Jin et al. ........................ 359/811 |

FOREIGN PATENT DOCUMENTS

| JP | 2003-094445 | 4/2003 |
| JP | 2004-229167 | 8/2004 |

OTHER PUBLICATIONS

Extended European Search Report, dated Jul. 7, 2014, in Application No. 08871408.4.

*Primary Examiner* — Larry Thrower
(74) *Attorney, Agent, or Firm* — Fildes & Outland, P.C.

(57) ABSTRACT

The present invention provides an optical part manufacturing method and an optical part manufacturing apparatus capable of manufacturing optical parts, whereby aligning an optical part with a bonded member and bonding the optical part and the bonded member can be accomplished successively, and a mold manufacturing method and a mold manufacturing apparatus capable of manufacturing a mold that is used to mold optical parts as above. A molding apparatus 10 performs a deformation step of bringing a light curing resin and a first transfer body 102 having a profile to form an optical element 404 and projections 406 in the light curing resin into contact with each other and deforming the light curing resin to copy the profile of the first transfer body 102, a hardening step of hardening the deformed light curing resin, a detaching step of detaching the light curing resin and the first transfer body 102 from each other, and repeats a transfer step of transferring the profile of the first transfer body 102 to the light curing resin a plurality of times to manufacture a lens array 402.

7 Claims, 17 Drawing Sheets

(51) Int. Cl.
  *G02B 3/00* (2006.01)
  *G02B 7/02* (2006.01)
  *G02B 13/00* (2006.01)
  *B29C 35/08* (2006.01)
  *B29C 43/36* (2006.01)
  *B29L 11/00* (2006.01)

(52) U.S. Cl.
  CPC ...... *G02B13/0085* (2013.01); *B29C 2035/0827* (2013.01); *B29C 2043/3615* (2013.01); *B29L 2011/0016* (2013.01)

FIG. 1
(a)
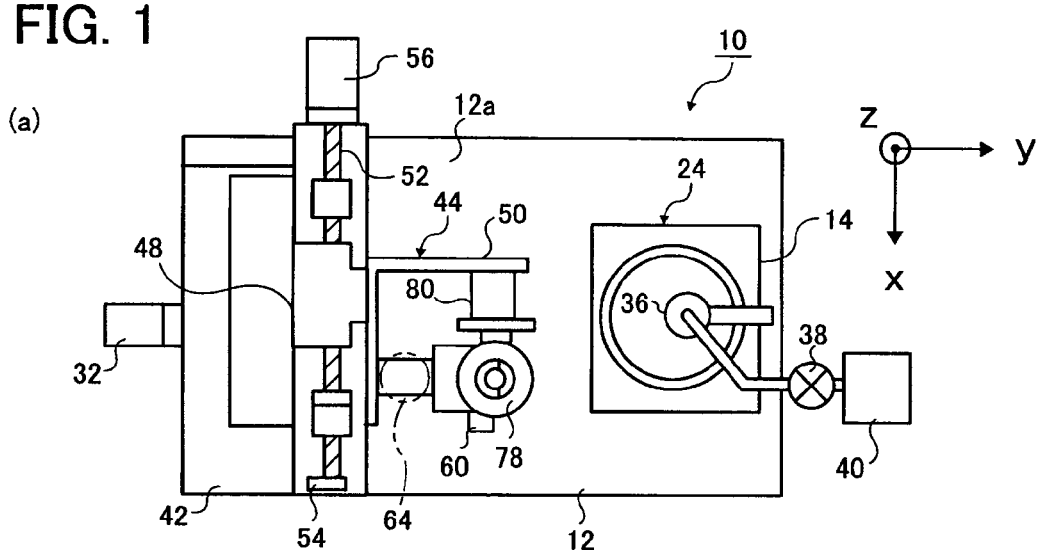
(b)
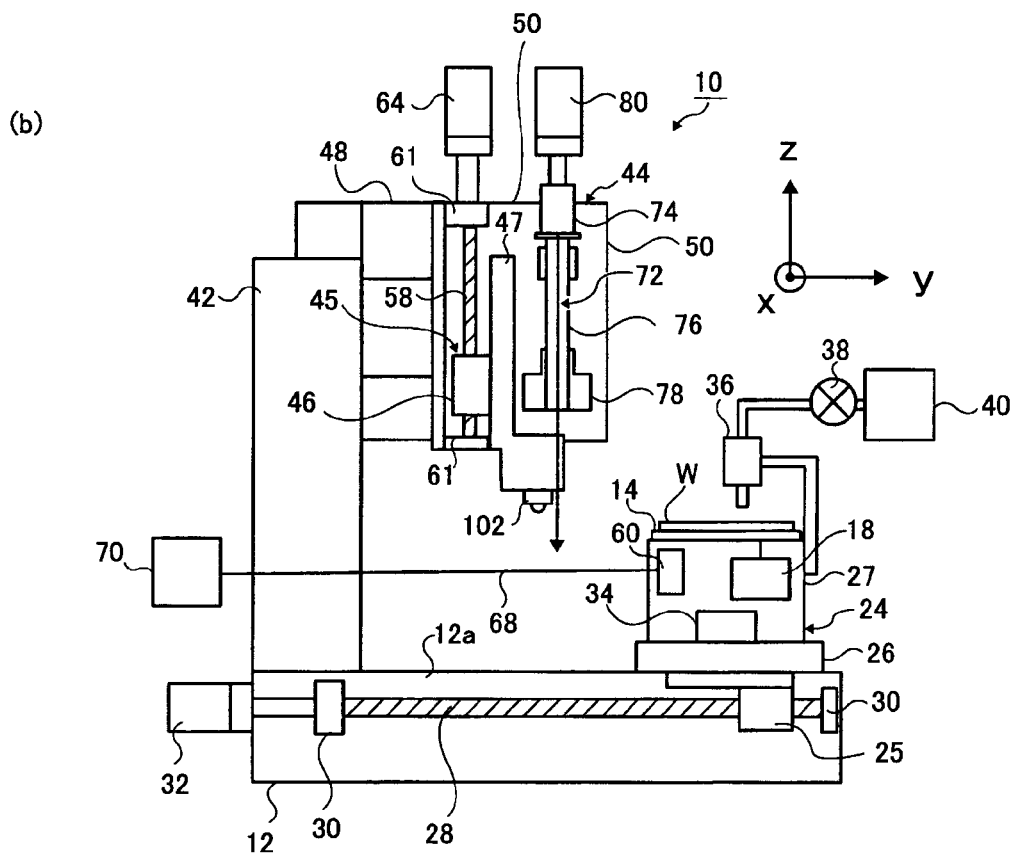

FIG. 2
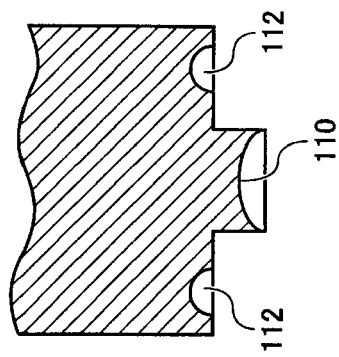
(c)
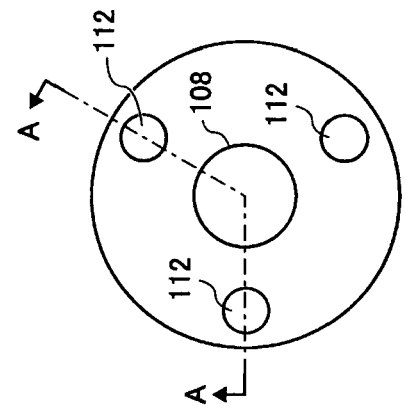
(b)
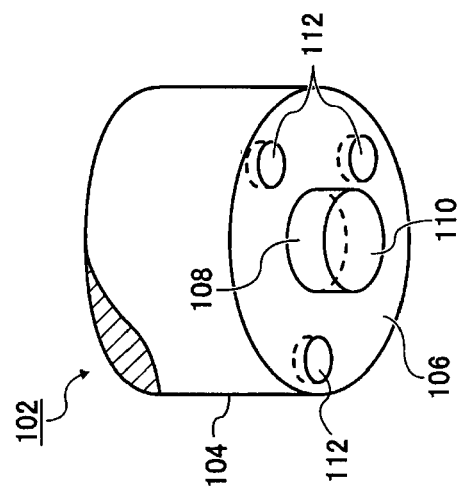
(a)

FIG. 3
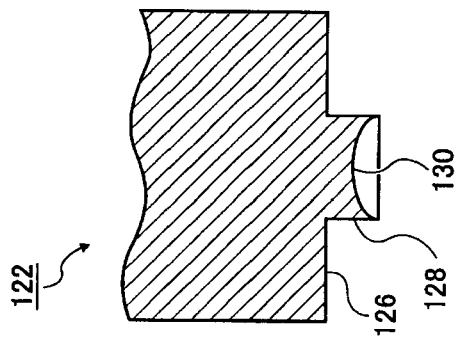
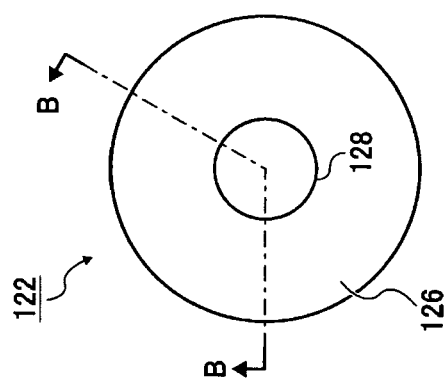
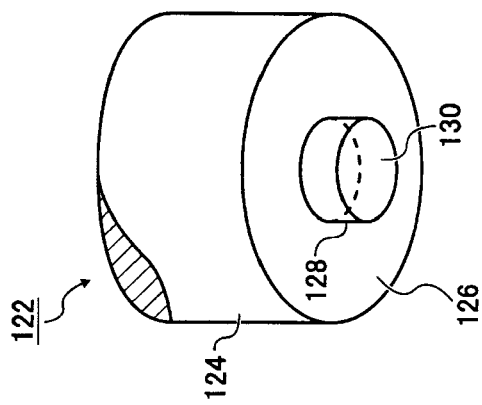

FIG. 16
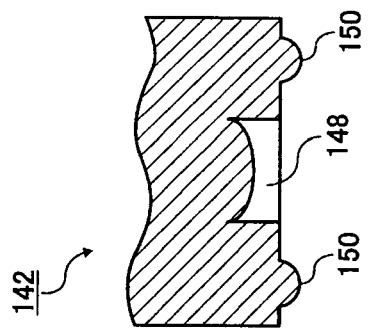
(c)
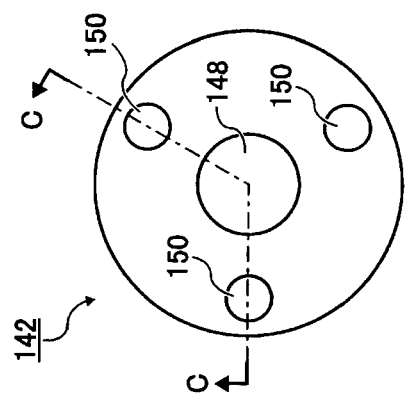
(b)
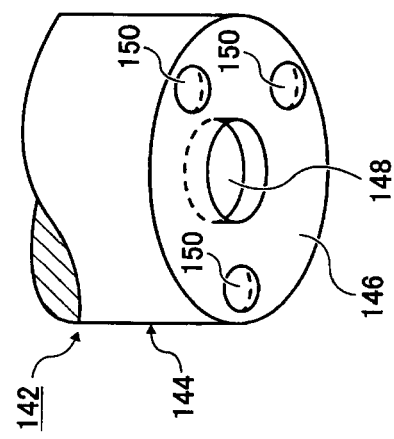
(a)

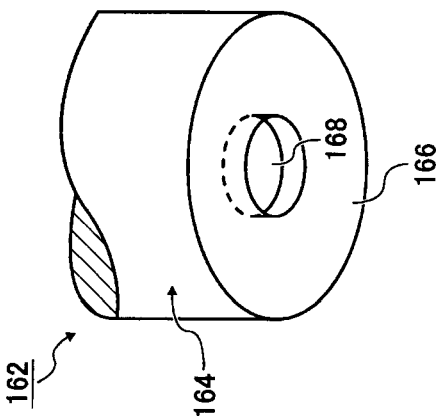
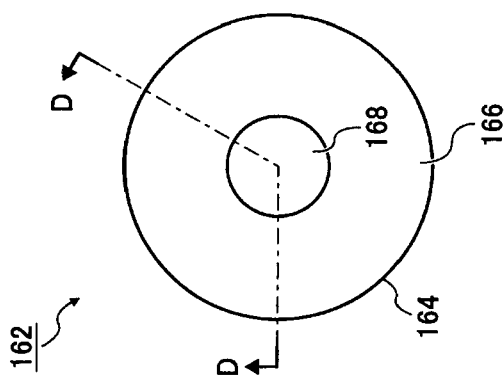
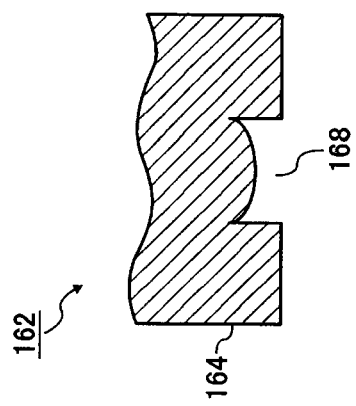
FIG. 17

FIG. 18
(a)
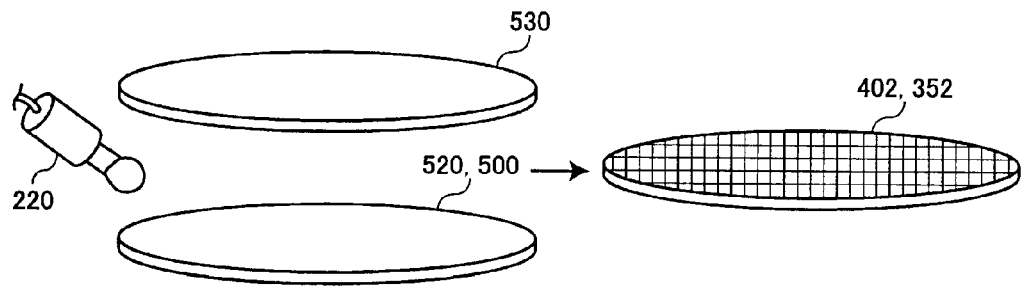
(b)
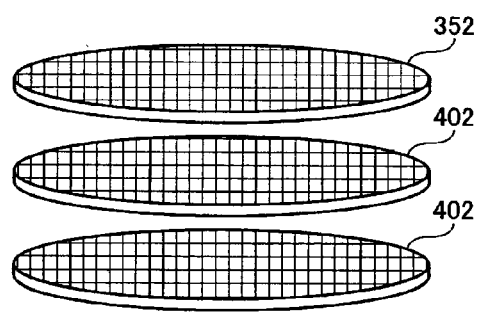
(c)
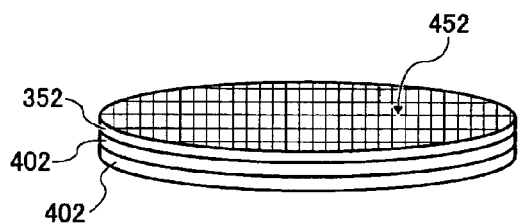
(d)
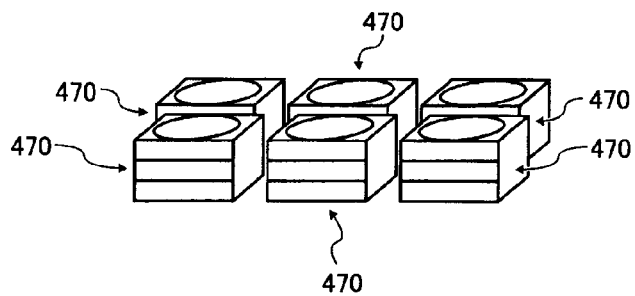

OPTICAL PART MANUFACTURING METHOD, MOLD MANUFACTURING METHOD, OPTICAL PART MANUFACTURING APPARATUS, AND MOLD MANUFACTURING APPARATUS

TECHNICAL FIELD

The present invention relates to an optical part manufacturing method and an optical part manufacturing apparatus which are used to manufacture optical parts such as, for example, lenses, lens arrays, light guide plates for use in a liquid crystal display panel, and a camera equipped with a light receiving element such as a CMOS (Complementary Metal Oxide Semiconductor) sensor as well as a mold manufacturing method and a mold manufacturing apparatus which are used to manufacture molds, for example, a mold which is used to mold optical parts or the like and a mold such as a matrix which is used for electroforming.

BACKGROUND ART

A method for manufacturing camera modules is known (Patent Document 1). An image sensor wafer in which a plurality of image sensor chips are arranged in a matrix, each chip having a photoelectric conversion element disposed on the surface and an external connection terminal disposed on the reverse surface, and a lens array in which a plurality of lenses are arranged in a matrix, each lens corresponding to each of the image sensor chips are prepared. The method comprises the steps of making cutting kerfs on the lens array, bonding the lens array onto the surface of the image sensor wafer, and dividing into pieces of camera modules by cutting the image sensor chips and the lenses along the cutting kerfs.
Patent Document 1: Japanese Laid-Open Patent Application No. 2004-229167

DISCLOSURE OF INVENTION

Problems to be Solved by the Invention

However, the technique described in Patent Document 1 involves a problem in which bonding an optical part and another part may not be performed well; i.e., the bonding step may fail to align an optical part such as, e.g., the lens array with a bonded member such as, e.g., an image sensor wafer, which needs be bonded to the optical part, and it involves a difficulty of maintaining a gap between the optical part and the bonded member constant throughout the bonding interface.

The present invention is intended to provide an optical part manufacturing method and an optical part manufacturing apparatus capable of manufacturing optical parts, whereby aligning an optical part with a bonded member and bonding the optical part and the bonded member can be accomplished successively in comparison to prior art, and to provide a mold manufacturing method and a mold manufacturing apparatus capable of manufacturing a mold that is used to mold optical parts as above.

Means for Solving the Problems

A first feature of the present invention resides in an optical part manufacturing method comprising: a deformation step of bringing a molding material and a transfer body having a transfer element including an optical element forming part to form an optical element in the molding material and projection forming parts to form projections in positions apart from a position where the optical element is formed in the molding material and deforming the molding material to copy the profile of the transfer element; a hardening step of hardening at least a deformed area of the molding material; and a detaching step of detaching the molding material and the transfer body from each other, wherein a transfer step of transferring the profile of the transfer element to the molding material is repeated a plurality of times to manufacture an optical part.

Preferably, the foregoing method further comprises a dividing step of dividing the optical part into a plurality of optical components, each including at least one optical element.

Preferably, the foregoing method further comprises a bonding step of bonding the optical part and a bonded part so that the projections come in contact with the bonded part.

Preferably, the foregoing method further comprises a dividing step of dividing a bonded product in which the optical part and the bonded part are bonded together into a plurality of optical components, each including at least one optical element.

Preferably, a transfer body having one optical element forming part and at least three projection forming parts formed thereon is used as the transfer body.

Preferably, a molding material made of a light curing material is used and the hardening step hardens the molding material by light irradiation.

Preferably, a molding material made of a thermal curing material is used and the hardening step hardens the molding material by heating.

A second feature of the present invention resides in an optical part manufacturing method comprising a mold manufacturing step of manufacturing a mold and a molding step of molding an optical part using a mold manufactured by the mold manufacturing step, the mold manufacturing step including a deformation step of bringing a molding material and a transfer body having a transfer element in contact with each other and deforming the molding material to copy the profile of the transfer element so that an optical element forming part to form an optical element and recess holes arranged apart from a position where the optical element is formed are shaped in the molding material; a hardening step of hardening at least a deformed area of the molding material; and a detaching step of detaching the molding material and the transfer body from each other, wherein a transfer step of transferring the profile of the transfer element to the molding material is repeated a plurality of times to manufacture a mold having a plurality of counter profiles of the profile of the transfer element formed thereon, the molding step including: a step of feeding the material of an optical part onto one side of a mold manufactured by the mold forming step, having the optical element forming parts and the recess holes formed thereon; and a step of hardening the material of an optical part remaining deformed to copy the profile of the side of the mold manufactured by the mold forming step, having the optical element forming parts and the recess holes formed thereon.

A third feature of the present invention resides in a mold manufacturing step comprising: a deformation step of bringing a molding material and a transfer body having a transfer element in contact with each other and deforming the molding material to copy the profile of the transfer element so that an optical element forming part to form an optical element and recess holes arranged apart from a position where the optical element is formed are shaped in the molding material; a hardening step of hardening at least a deformed area of the molding material; and a detaching step of detaching the molding material and the transfer body from each other, wherein a transfer step of transferring the profile of the transfer element to the molding material is repeated a plurality of times to manufacture a mold.

A fourth feature of the present invention resides in an optical part manufacturing apparatus comprising: a support section that holds a molding material; a transfer body that is installed so as to be contactable with the molding material held on the support section and has a transfer element including an optical element forming part to form an optical element in the molding material and projection forming parts to form projections in positions apart from a position where the optical element is formed in the molding material; a moving apparatus that moves at least one of the support section and the transfer body to bring the molding material held on the support section and the transfer body into contact with each other and detach them from each other; a hardening device that hardens at least a contact and deformed area of the molding material, contacting with the transfer body and deformed to copy the profile of the transfer element; and a controller that controls at least the moving apparatus and the hardening device so that the profile of the transfer element is transferred to the molding material a plurality of times.

A fifth feature of the present invention resides in a mold manufacturing apparatus comprising: a support section that holds a molding material; a transfer body that is installed so as to be contactable with the molding material held on the support section and used to deform the molding material into a mold having an optical element forming part to form an optical element and recess holes arranged apart from a position where the optical element is formed; a moving apparatus that moves at least one of the support section and the transfer body to bring the molding material held on the support section and the transfer body into contact with each other and detach them from each other; a hardening device that hardens at least a contact and deformed area of the molding material, contacting with the transfer body and deformed to copy the profile of the transfer element; and a controller that controls at least the moving apparatus and the hardening device so that the profile of the transfer element is transferred to the molding material a plurality of times.

Advantageous Effects of the Invention

According to the present invention, it is possible to provide an optical part manufacturing method and an optical part manufacturing apparatus capable of manufacturing optical parts, whereby aligning an optical part with a bonded member and bonding the optical part and the bonded member can be accomplished successively in comparison to prior art, and to provide a mold manufacturing method and a mold manufacturing apparatus capable of manufacturing a mold that is used to mold optical parts as above.

BRIEF DESCRIPTION OF THE DRAWINGS

FIG. 1 depicts an overview structure of a bonding apparatus pertaining to a first embodiment of the present invention, wherein FIG. 1(a) is a plan view and FIG. 1(b) is a left side view.

FIG. 2 depicts a first transfer body which is used in the first embodiment of the present invention, wherein FIG. 2(a) is a perspective view, FIG. 2(b) is a bottom view, and FIG. 2(c) is a cross-sectional view along line A-A in FIG. 2(b).

FIG. 3 depicts a second transfer body which is used in the first embodiment of the present invention, wherein FIG. 3(a) is a perspective view, FIG. 3(b) is a bottom view, and FIG. 3(c) is a cross-sectional view along line B-B in FIG. 3(b).

FIG. 8 depicts lens arrays manufactured by the first embodiment of the present invention, wherein FIG. 8(a) is a cross-sectional view depicting a lens array manufactured using the second transfer body and FIG. 8(b) is a cross-sectional view depicting a lens array manufactured using the first transfer body.

FIG. 15 depicts molds manufactured by a manufacturing method pertaining to a second embodiment of the present invention, wherein FIG. 15(a) is a cross-sectional view depicting a mold manufactured using the second transfer body and FIG. 15(b) is a cross-sectional view depicting a mold manufactured using the first transfer body.

FIG. 16 depicts a third transfer body which is used in the second embodiment of the present invention, wherein FIG. 16(a) is a perspective view, FIG. 16(b) is a bottom view, and FIG. 16(c) is a cross-sectional view along line C-C in FIG. 16(b).

FIG. 17 depicts a third transfer body which is used in the second embodiment of the present invention, wherein FIG. 17(a) is a perspective view, FIG. 17(b) is a bottom view, and FIG. 17(c) is a cross-sectional view along line D-D in FIG. 17(b).

FIGS. 18a-d illustrate the steps of a manufacturing method pertaining to the second embodiment of the present invention.

LIST OF REFERENCE NUMERALS

Figure 4:
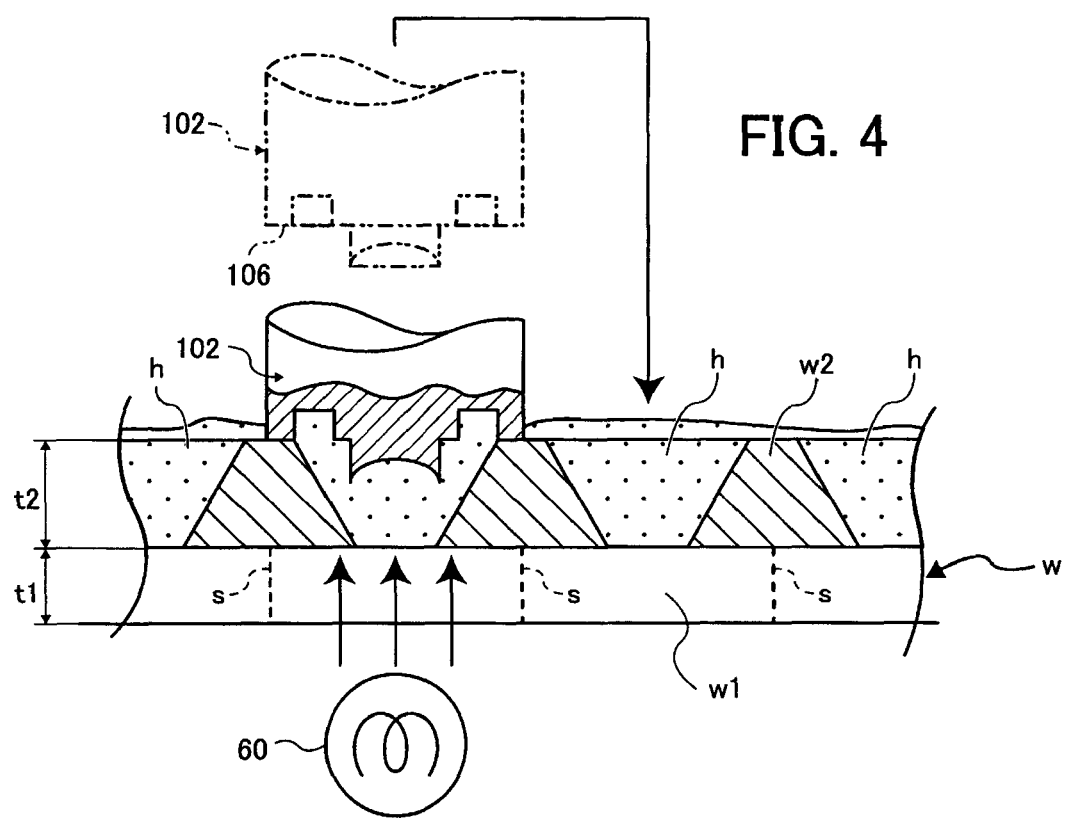
FIG. 4 is a partial cross-sectional view depicting the first transfer body and a wafer used in the first embodiment of the present invention.

10 Molding apparatus
102 First transfer body
106 Undersurface
108 Optical element forming part
112 Recess hole
142 Third transfer body
146 Undersurface
148 Recess hole
150 Projection
200 Controller
402 Lens array
404 Optical element 406 Projection
452 Bonded lens array product
470 Lens
520 Mold
522 Optical element forming part
524 Recess hole

BEST MODE FOR CARRYING OUT THE INVENTION

Embodiments of the present invention will now be described based on the drawings.

In FIG. 1, a molding apparatus 10 pertaining to a first embodiment of the invention is depicted.

The molding apparatus 10 is used as an optical part manufacturing apparatus to manufacture optical parts and also used as a mold manufacturing apparatus to manufacture a mold. The molding apparatus 10 operates according to an optical part manufacturing method for manufacturing optical parts and according to a mold manufacturing method for manufacturing a mold.

The molding apparatus 10 has a pedestal 12 which is mounted on a mounting surface and a movable platform 24 is supported on the pedestal 12. A support platform 14 is further supposed on the top surface of the movable platform 24.

The movable platform 24 consists of a bottom section 26 with an outthrust portion 25 protruding downward and an upper section 27 placed on the top of the bottom section 26. The movable platform 24 is installed on the pedestal 12 such that the outthrust portion 25 is fit into a groove (not shown) extending in a y-axis direction formed in the top surface 12a of the pedestal 12. Thus, the movable platform 24 is guided through the groove extending in the y-axis direction and can be moved in the y-axis direction on the surface 12a. The outthrust portion 25 is engaged around a feed screw 28. The feed screw 28 is turnably supported by means of bearings 30 and disposed in the pedestal 12, extending so that its axial (longitudinal) direction coincides with the y-axis direction. A y-axis motor 32 fixed to the pedestal 12 is connected to the left end of the feed screw 28, as seen in FIG. 1. Therefore, by running the y-axis motor 32, the driving force is transmitted via the feed screw 28 to the outthrust portion 25 and the movable platform 24 moves in the y-axis direction. Which direction along the y axis in which the movable platform should be moved can be determined by controlling the rotational direction of the y-axis motor 32.

In the upper section 27 of the movable platform 24, a θ-axis motor 34 is installed. The θ-axis motor 34 rotates the upper section 27 of the movable platform 24 around a rotational axis that is perpendicular to Z axis with respect to the bottom section 26 of the movable platform 24. In this way, the movable platform 24 as a whole can move in the y-axis direction and the upper section 27 can rotate with respect to the bottom section 26.

A wafer W which is made of, e.g., glass is mounted on the support platform 14 and the support platform 14 supports the mounted wafer W from underneath in a direction of gravitational force. A drive source 18 comprising, e.g., a motor is connected to the support platform 14. Thus, the support platform 14 can rotate together with the wafer W with respect to the upper section 27 of the movable platform 24 and is constructed as a rotary table for spin coating which is used when applying resin or the like to a wafer W by so-called spin coating. The support platform 14 is made of a material having light permeability such as, e.g., glass, and allows light emitted by a light irradiation device 60 which will be described later to pass through it. To mount a wafer W on the support platform 14 and remove the wafer W mounted on the support platform 14, a mounting/dismounting apparatus (not shown) comprising, e.g., a robot may be used or this work may be manually performed by operational personnel.

In the upper section 27 of the movable platform 24, a feeder 36 is installed to feed light curing resin which is used as a molding material to a wafer W. A reservoir 40 for storing the light curing resin is connected to the feeder 36 via a valve 38. The feeder 36 can feed the light curing resin stored in the reservoir 40 from above to let the resin fall in roughly the center of a wafer W which is roughly circular (in a disk shape). The light curing resin fed to the wafer W is diffused centrifugally by the rotation of the support platform 14 for a predetermined period of time, thus producing a layer of the resin with a roughly uniform thickness applied over the surface of the wafer W.

The light irradiation device 60 which is used as a curing device is also installed in the upper section 27 of the movable platform 24. The light irradiation device 60 is connected to a light source 70 by an optical fiber 68 which is used as light transmission means and used to irradiate the light curing resin applied onto the wafer W with light. In this embodiment, the light irradiation device 60 is installed in a position that is lower than the support platform 14, a wafer W, and light curing resin applied onto the wafer W and opposite to the side of the wafer which is brought into contact with a first transfer body 102 which will be described later. Hence, the light irradiation device 60 can irradiate the light curing resin with light without being blocked by the first transfer body 102, when the first transfer body 102 is brought into contact with the light curing resin.

The movable platform 24 is installed on and a column 42 is fixed to the pedestal 12. A movable unit 44 is attached to the column so that it can move in an x-axis direction with respect to the column 42. The movable unit 44 consists of a left section 48 positioned leftward in the figure and a right section 50 fixed to the left section 48. The left section 48 is anchored to the column 42 movably in the x-axis direction and engages around a feed screw 52. The feed screw 52 is attached along the column 42, turnably supported by a baring 54, extending so that its axial direction coincides with the x-axis direction.

An x-axis motor 56 fixed to the column 42 is connected to one end of the feed screw 52. Therefore, when the x-axis motor 56 is run, the driving force of the x-axis motor 56 is transmitted to the left section 48 via the feed screw 52 and the left section 48 and the right section 50 of the movable unit 44 move together in the x-axis direction. Which direction along the x axis in which the movable unit 44 should be moved can be determined by controlling the rotational direction of the x-axis motor 56.

The first transfer body 102 is attached to the right section 50 of the movable unit 44 via a bearing member 45. The bearing member 45 is installed movably in a z-axis direction with respect to the movable unit 44 and consists of an outthrust section 46 protruding leftward, as seen in FIG. 1, and a bearing section 47 fixed to the outthrust section 46. The first transfer body 102 which is used as a transfer body is placed removably, for example, on the undersurface of the bearing section 47.

Because the first transfer body 102 placed on the bearing section 47 can be removed, it is possible to place another transfer body replacing the first transfer body 102.

The outthrust section 46 is screwed with a feed screw 58. The feed screw 58 is turnably supported by means of bearings 61 and disposed in the right section 50 of the movable unit 44, extending so that its axial direction coincides with the z-axis direction. The upper end of the feed screw 58 is connected to a z-axis motor forbearing member 64. Therefore, when the z-axis motor for bearing member 64 is run, the driving force is transmitted to the bearing member 45 via the feed screw 58, and the bearing member 45 and the first transfer body 102 borne by the bearing member 45 move together in the z-axis direction.

In the right section 50 of the movable unit 44, a detector 72 which is used as detecting means for detecting the positions of the wafer W and the first transfer body 102 is installed movably up and down (movably in the x-axis direction) independently of the bearing member 45. The detector 72 comprises an image capturing unit 74 which may comprise, e.g., a CCD camera unit 74, a lens unit 76 provided on the side toward the wafer W of the image capturing unit 74, and a light 78 which is used as illumination means for providing sufficient brightness for the image capturing unit 74 to capture an image well. The detector 72 is equipped with a z-axis motor 80 for detector which is used as a drive source for moving the detector 72 in the z-axis direction with respect to the movable unit 44. By moving the detector 72 up and down, it is possible to focus the image capturing unit 74 on the first transfer body 102 and others.

As described above, the bearing member 45 is disposed movably in the z-axis direction with respect to the movable unit 44 and the movable unit is disposed movably in the x-axis direction with respect to the column 42. Therefore, it is possible to move the bearing member 45 in the x-axis direction and the first transfer body 102 in the z-axis direction by controlling the x-axis motor 56 and the z-axis motor for bearing member 64. As already described, the support platform 14 moves and rotates in the y-axis direction together with the movable platform 24 by driving the y-axis motor 32 and the θ-axis motor 34. Thus, it is possible to change a relative positional relationship among the wafer W, the light irradiation device 60, and the first transfer body 10 by controlling the y-axis motor 32, the x-axis motor 56, the z-axis motor for bearing member 64, and the θ-axis motor 34.

Then, by changing the relative positional relationship between the wafer W and the first transfer body 102, it is possible to bring the light curing resin applied onto the wafer W and the first transfer body 102 into contact with each other and detach them from each other. In this way, in this embodiment, the y-axis motor 32, the x-axis motor 56, the z-axis motor for bearing member 64, and the θ-axis motor 34 in conjunction with the feed screws 28, 52, 58, etc. are used as moving devices for moving at least one of the light curing resin and the first transfer body 102 so as to bring the light curing resin and the first transfer body 102 into contact with each other and detach them from each other. Details on controlling the y-axis motor 32, the x-axis motor 56, the z-axis motor for bearing member 64, and θ-axis motor 34 will be described later.

In the above-described embodiment, the light curing resin includes a resin that becomes hardened by being irradiated with an invisible light such as, e.g., an ultraviolet light curing resin. Although the light curing resin is used as a molding material in the above-described embodiment, a material that can be deformed to copy the profile of the first transfer body 102 by being brought into contact with the first transfer body 102 or pressed against the first transfer body 102 and hardened as it remains deformed can be used appropriately as a molding material. For example, a thermoset resin that becomes hardened by being heated can be used. Further, although the light irradiation device to harden the light curing resin is used as a hardening device to harden the molding material in this embodiment, another hardening device may be selected appropriately according to material used as the molding material. For example, in a case where the above-mentioned thermoset resin is used as the molding material, a heater to heat the thermoset resin should be selected as the hardening device.

In FIG. 2, the first transfer body 102 is depicted.

The first transfer body 102 is made of, e.g., a metal and has a roughly cylindrical body 104 whose undersurface 106 is used as a transfer element. In roughly the center of the undersurface 106, there is provided an optical element forming part 108 protruding downward which is used to form an optical element 404 such as, e.g., a lens (see FIG. 8) which will be described later. The undersurface 110 of the optical element forming part 108 may have, e.g., a spherical or aspherical surface which is formed by machining the first transfer body 102, for example, cutting and grinding it. The profile of the undersurface 110 is transferred to the light curing resin and the optical element 404 has a counter profile of the bottom surface 110 is formed in the light curing resin.

For manufacturing optical parts such as lenses or manufacturing a mold used to mold the optical parts by transferring the profile of the undersurface 110 of the optical element forming part 108 to the light curing resin or the like, there is a need for machining the optical element forming part 108 with high precision and, generally, such machining often requires a long time and high cost. For this reason, the first transfer body 102 is provided with only one optical element forming part 108 in this embodiment to reduce the machining time and curtail the cost.

Moreover, for example, three recess holes 112 are formed in the undersurface 106 of the first transfer body 104. These recess holes 112 are used as projection forming parts to form projections 406 (see FIG. 8) which will be described later in positions apart from the position where an optical element 404 is formed.

The recess holes 112 are provided in positions apart from the optical element forming part 108 and arranged in the undersurface 106 which is roughly circular at even intervals at angles of, for example, 120 degrees from the center. Preferably, three or more recess holes 112 are formed; for example, four recess holes 112 may be formed, although three recess holes 112 are formed in this embodiment.

In FIG. 3, a second transfer body 122 is depicted.

As already noted, a transfer body can be installed in and removed from the bearing section 47 (see FIG. 1). Another transfer body can be installed in the bearing section 47, instead of installing the first transfer body 102 in the bearing section 47. The second transfer body 122 depicted in FIG. 3 is one of transfer bodies that can be installed in the bearing section 47, replacing the transfer body 102.

An optical element forming part 128 is provided on the undersurface 126 of a main body 124 of the second transfer body 122, as in the previously described first transfer body 102. The undersurface of the optical element forming part 128 is machined to have a spherical or aspherical profile. However, no recess holes are formed in the undersurface 130 of the second transfer body 122, whereas, for example, three recess holes 112 are formed in the undersurface 106 of the previously described first transfer body 102.

In FIG. 4, a detailed view of the first transfer body 102 and the wafer W is depicted and the movement of the first transfer body 102 is illustrated.

As can be seen in FIG. 4, the wafer W is composed of a substrate W1 and a resin holding layer W2 overlaying the substrate W1. The substrate W1 is made of a light-permeable material, e.g., glass and its thickness t1 is, for example, 400μ.

The resin holding layer W2 is used to keep a light curing resin which is, for example, made of a liquid and has high fluidity before being hardened in predetermined positions. The resin holding layer W2 is made of, e.g., silicon and its thickness t1 is, for example, 725μ. A plurality of through holes h running through the layer from top to bottom are formed in the resin holding layer W2. Each through hole h is defined to have a shape, for example, like an earthenware mortar, i.e., its diameter becomes narrower from top toward bottom.

At points between two adjacent through holes h in the substrate W1, for example, scribe layers (kerfs) S are defined inside the substrate W1. Since the points where the scribe layers S are defined in the substrate W1 are less rigid than other portions, the substrate W1 is divided along the scribe layers S when the substrate W1 is divided.

In FIG. 4, the light curing resin is applied over the top surface of the wafer W and the applied light curing resin flows into the through holes h of the resin holding layer W2 and is thus held in the resin holding layer W2. A state is depicted where the first transfer body 102 is brought in contact with the thus held light curing resin such that at least its undersurface 106 comes in contact with the light curing resin.

In this state, when the contact area of the light curing resin with the undersurface 106 is irradiated with light by using the light irradiation device 60, the light curing resin is hardened and the profile of the undersurface 106 of the transfer body 102 is transferred to the light curing resin. After the hardening of the light curing resin, the first transfer body 102 is detached from the wafer W, as depicted with a two-dot chain line in FIG. 2. Then, the first transfer body 102 is moved to come in contact with unhardened resin held in another through hole h, for example, next to the through hole h holding the hardened resin, as indicated by an arrow in FIG. 2.

Figure 5:
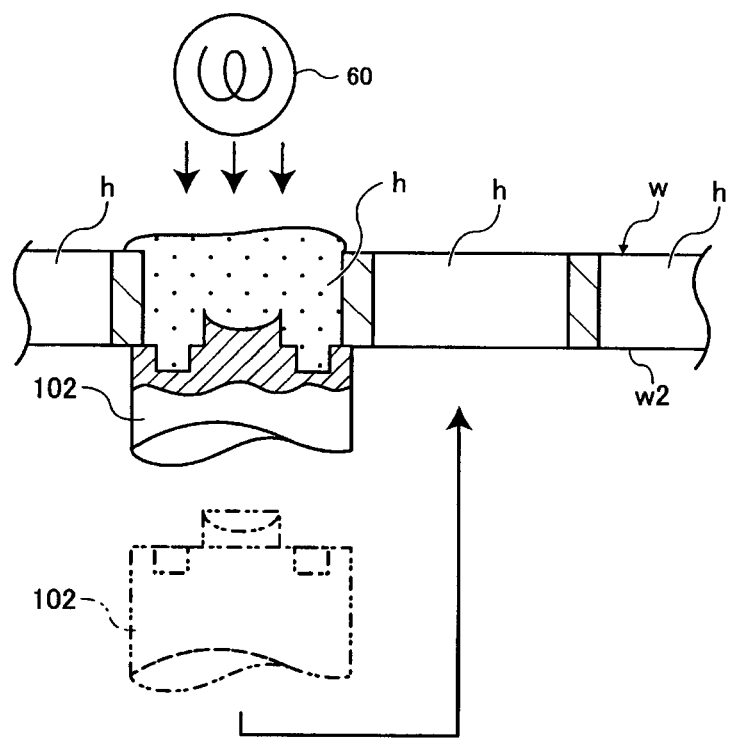
FIG. 5 is a partial cross-sectional view depicting a first modification example of a wafer used in the first embodiment of the present invention.

In FIG. 5, a first modification example of a wafer W is depicted.

While the wafer W pertaining to the previously described embodiment consists of the substrate W1 and the overlying resin holding layer W2, the substrate W1 pertaining to this first modification example consists entirely of the resin holding layer W2. In a case where the substrate W1 pertaining to the first modification example is used, the configuration of the molding apparatus 10 needs to be modified to enable the following: bringing the first transfer body 102 in contact with the resin holding layer W2 from underneath to plug up at least one through hole h from underneath, feeding the light curing resin from above into the through hole h whose bottom is plugged, and irradiating the light curing resin fed into the through hole h with light from above. Parts corresponding to those of the wafer W pertaining to the previously described embodiment are assigned the same numbers in FIG. 5 and their description is omitted.

Figure 6:
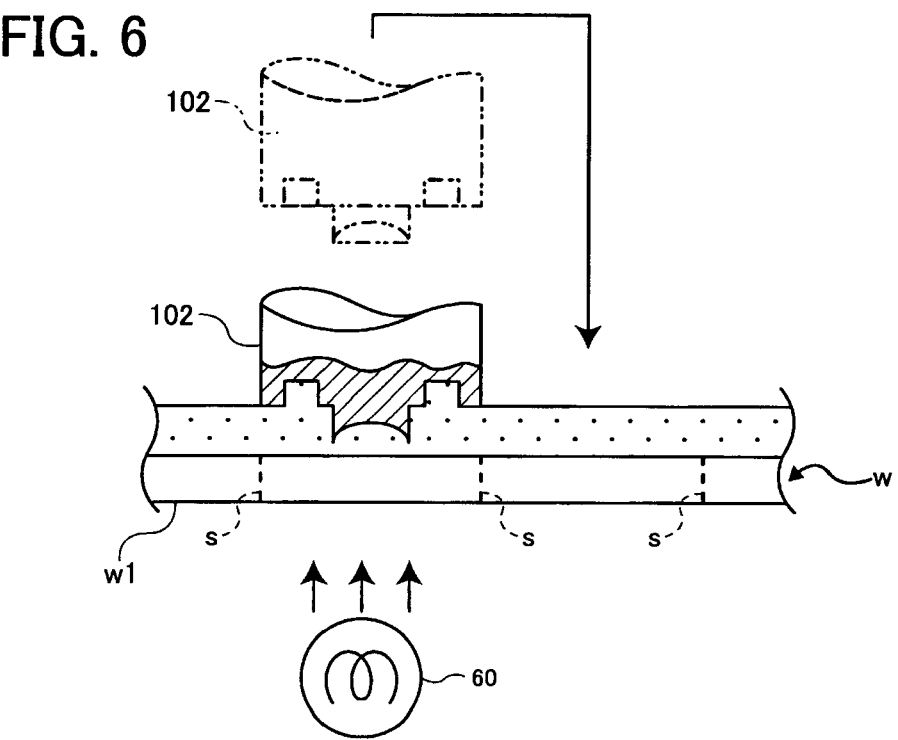
FIG. 6 is a partial cross-sectional view depicting a second modification example of a wafer used in the first embodiment of the present invention.

In FIG. 6, a second modification example of a wafer W is depicted.

While the wafer W pertaining to the previously described embodiment consists of the substrate W1 and the overlying resin holding layer W2, the wafer W of this second modification example consists of the substrate W1 without the resin holding layer W2. Accordingly, in the second modification example, the light curing resin is simply applied over substrate W1 without being held by the resin holding layer W2 or the like.

Parts corresponding to those of the wafer W pertaining to the previously described embodiment are assigned the same numbers in FIG. 6 and their description is omitted.

Figure 7:
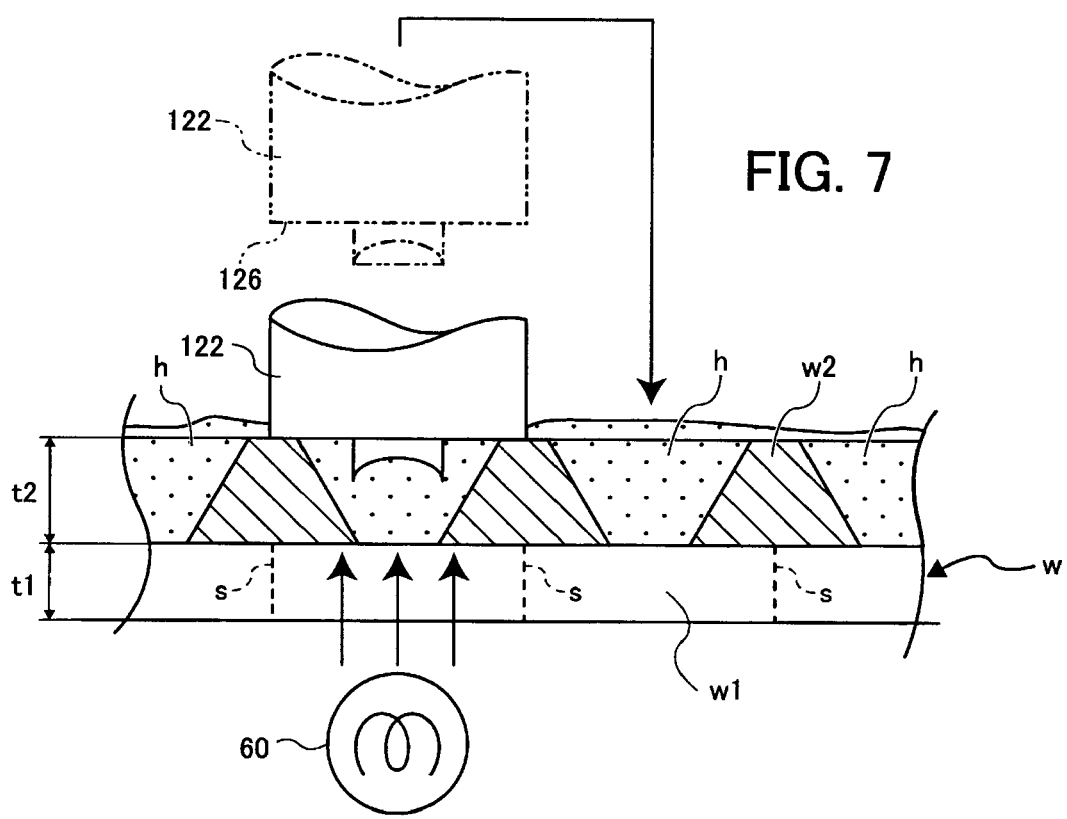
FIG. 7 illustrates the movement of the second transfer body used in the first embodiment of the present invention.

In FIG. 7, the movement of the second transfer body 122 is illustrated. That is, FIG. 7 illustrates the movement of the second transfer body 122 for which the transfer body installed in the bearing section 47, i.e., the first transfer body 102 installed in the bearing section 47 (see FIG. 1) is exchanged.

As is the case with the first transfer body 102, the second transfer body 122 is brought in contact with the wafer W over which the light curing resin is applied such at least its undersurface 126 comes in contact with the resin. After the curing resin hardened by light irradiation by the light irradiation device 60, the second transfer body 122 is detached from the wafer W, as depicted with a two-dot chain line in FIG. 7. Then, the second transfer body 122 is moved to come in contact with unhardened resin held in another through hole h, for example, next to the through hole h holding the hardened resin, as indicated by an arrow in FIG. 7.

Figure 8:
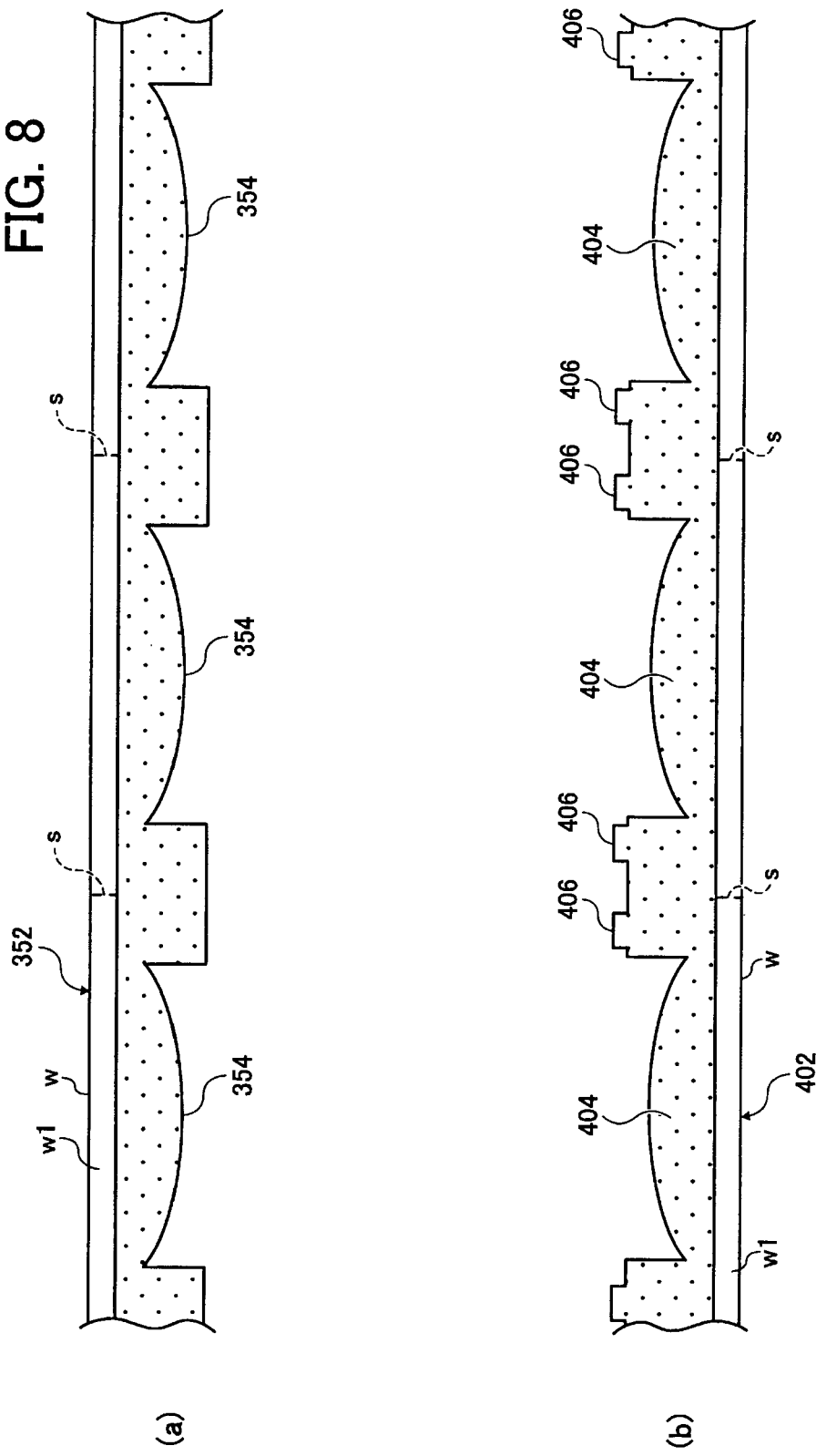

In FIG. 8, lens arrays manufactured by the molding apparatus 10 are depicted, wherein FIG. 8(a) shows a lens array 352 manufactured using the second transfer body 122 and FIG. 8(b) shows a lens array 402 manufactured using the first transfer body 102.

The lens array 402 is manufactured using the wafer W consisting entirely of the substrate W1 without the resin holding layer W2 and comprises a plurality of optical elements 404 which are used as optical components, each comprising a lens, and a plurality of projections 406. The projections 406 are formed in positions apart from an optical element 404. For example, three projections are arranged around one optical element 404 at even intervals at angles of 120 degrees from the center.

The lens array 352 is used as a part to be bonded to, e.g., the lens array 402. As is the case with the lens array 402, the lens array 352 is manufactured using the wafer W consisting entirely of the substrate W1 without the resin holding layer W2. It comprises a plurality of optical elements 354. However, the projections 406 formed in the lens array 402 are not formed in the lens array 352.

Spacing between the optical elements 404 in the lens array 402 is identical to spacing between the optical elements 354 in the lens array 352. This allows vertical alignment between the optical elements 354 and the optical elements 404 when bonding the lens array 402 and the lens array 352. The lens array 352 and the lens array 402 are bonded such that the projections 406 come in contact with the lens array 352.

Details on bonding the lens array 352 and the lens array 402 will be described later.

Figure 9:
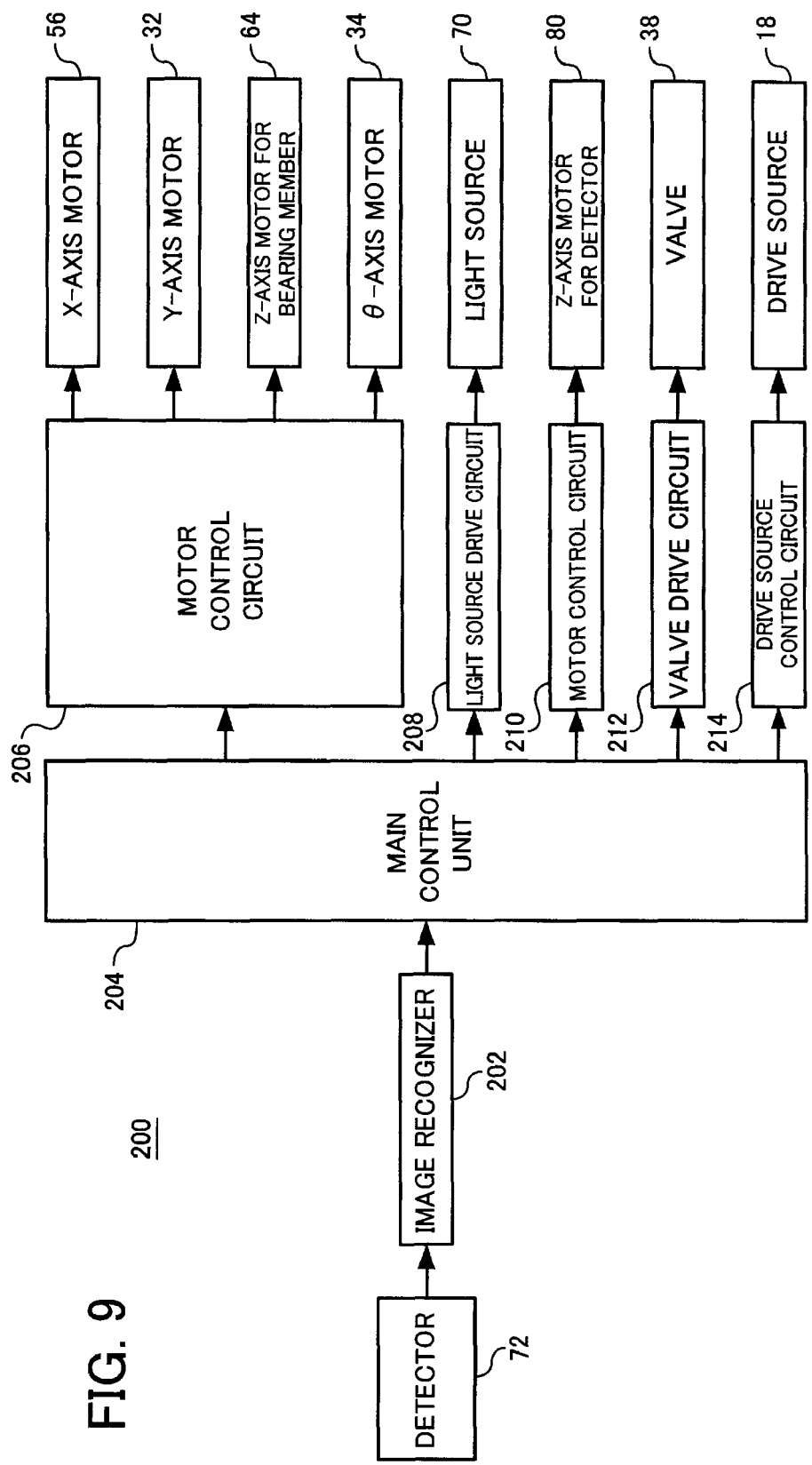
FIG. 9 is a block diagram representing a controller used in the bonding apparatus pertaining to the first embodiment of the present invention.

FIG. 9 illustrates, in a block diagram, a controller 200 comprised in the molding apparatus 10.

As is shown in FIG. 9, the controller 200 includes a main control unit 204 to which an output from the detector 72 is input via an image recognizer 202 which recognizes an image captured by the detector 72. The main control unit 204 controls the y-axis motor 32, x-axis motor 56, z-axis motor for bearing member 64, and θ-axis motor 34 by controlling a motor control circuit 206. The main control unit 204 also controls the light source 70 by controlling a light source drive circuit 208. The main control unit 204 also controls the z-axis motor 80 for detector by controlling a motor control circuit 210. Further, the main control unit 204 controls the valve 38 by controlling a valve drive circuit 212. Moreover, the main control unit 204 controls the drive source 18 by controlling a drive source control circuit 214.

Figure 10:
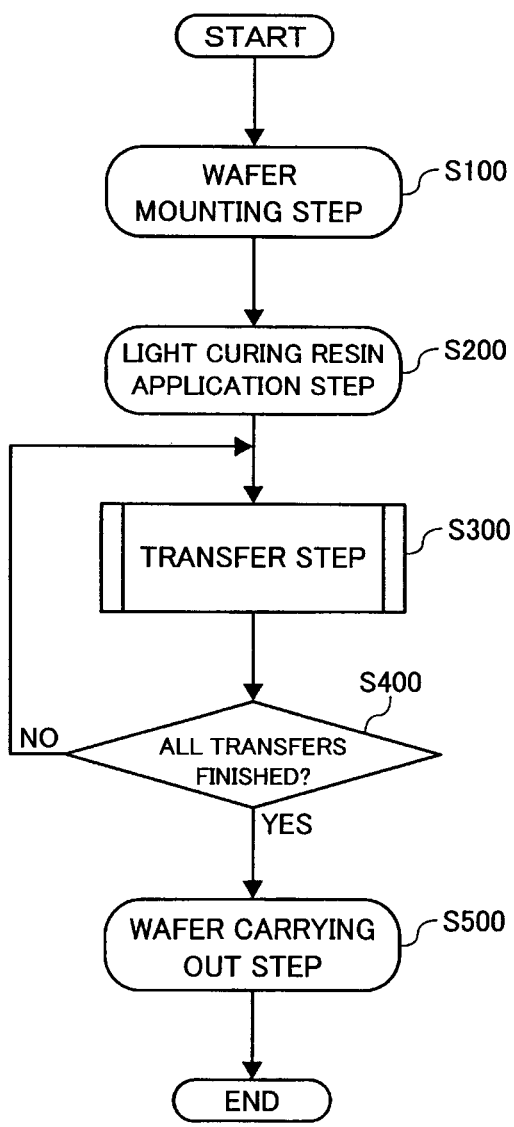
FIG. 10 is a flowchart illustrating the operation of the bonding apparatus pertaining to the first embodiment of the present invention.

FIG. 10 is a flowchart that illustrates controlling the molding apparatus 10 by the controller 200, representing the steps of the optical part manufacturing method which is used to manufacture, e.g., the above-mentioned lens array 402.

Before the start of a series of the steps, it is made certain that the first transfer body 102 is installed as a transfer body in the bearing section 47.

Upon the start of a series of the steps, a mounting step of mounting a wafer W on the support platform 14 is performed at step S100. At the next step S200, a light curing resin application step of applying the light curing resin onto the wafer W is performed. In the light curing resin application step, the main control unit 204 controls the valve drive circuit 212 to keep the valve 38 open for a predetermined time and feed the light curing resin to the surface of the wafer W. After feeding the light curing resin, the main control unit 204 controls the drive source control circuit 214 to drive the drive source 18 for a predetermined time. The drive of the drive source 18 rotates the support platform 14, so that the light curing resin fed to the wafer W mounted on the support platform 14 is centrifugally diffused roughly evenly over the surface of the wafer W.

At the next step S300, a transfer step of transferring the profile of the undersurface 106 of the first transfer body 102 to the light curing resin is performed. Details on the transfer step S300 will be described later.

At the next step S400, it is determined whether all transfer steps are finished. That is, the transfer step as the step S300 is repeated, for example, 1500 to 2400 times and it is determined whether the last transfer step of the repetition is done. Unless the last transfer step is done as determined at step S400, the process returns to step S300. If the last transfer step is done as determined at step S400, the process goes to the next step S500.

At step S500, the wafer W in which the profile transfers to the applied light curing resin are done is removed from the support platform 14 and carried out of the molding apparatus 10. In a case where the molding apparatus 10 does not include an apparatus such as a robot to mount a wafer W on the support platform 14 and remove and carry out the wafer W from the molding apparatus 10, mounting a wafer W on the support platform 14 and removing the wafer W from the molding apparatus 10 are manually performed by operational personnel; in this case, the steps S100 and S500 under the control of the main control unit 204 are not performed.

Figure 11:
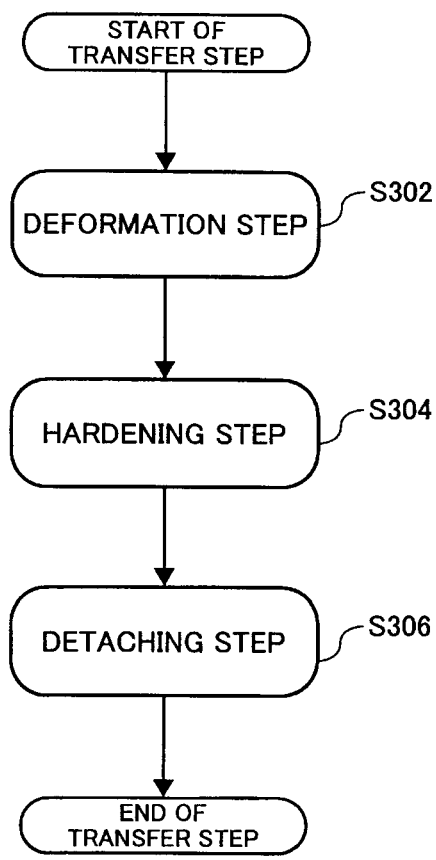
FIG. 11 is a flowchart illustrating the transfer operation of the bonding apparatus pertaining to the first embodiment of the present invention.

FIG. 11 is a flowchart illustrating the details of control by the controller 200 in the transfer step (step S300).

Upon the start of the transfer step, a deformation step of deforming the light curing resin applied onto the wafer W to copy the defined profile of the first transfer body 102 is performed at step S302. More specifically, at step S302, the main control unit 204 controls the motor control circuit 206 to drive the y-axis motor 32, x-axis motor 56, z-axis motor for bearing member 64 and θ-axis motor 34, so that the motors moves at least one of the first transfer body 102 and the support platform 14 to bring the first transfer body 102 in contact with a predetermined position of the light curing resin applied on to wafer W, thereby deforming the light curing resin.

In the deformation step S302, based on data detected by the detector 72 and image processed by the image recognizer 202, position correction data for the support platform 14 and the first transfer body 102 may be created to bring the first transfer body 102 into contact with a proper position in the light curing resin. Based on this correction data, the motors may be controlled by the control unit 204 to move at least one of the first transfer body 102 and the support platform 14.

In the deformation step S302, the light curing resin is deformed to copy the profile of the undersurface 106 of the first transfer body 102, as already described. More specifically, the light curing resin is deformed to define the profile of an optical element 404 comprising a lens by copying the optical element forming part 108 and deformed to define the profiles of the projections 406 by copying the profiles of recess holes 112 used as the projection forming parts.

At the next step S304, a hardening step of hardening the light curing resin deformed to copy the first transfer body 102 by the contact with the first transfer body 102 is performed. More specifically, the main control unit 204 controls the light source drive circuit 208 so that the light source 70 will irradiate at least the contact and deformed area of the light curing resin contacting with the first transfer body 102 with light for a predetermined time. Through the hardening step S304, the light curing resin remaining deformed into the lens profile is hardened and one optical element 404 and three projections 406 are produced in the light curing resin.

At the next step S306, a detaching step of detaching the hardened light curing resin and the first transfer body 102 from each other is performed. More specifically, the main control unit 204 controls the motor control circuit 206 to drive the z-axis motor for bearing member 64 so that the motor moves up the first transfer body 102 placed in contact with, e.g., thermal curing resin.

A series of steps in the transfer step is finished by executing the above-described steps S302, S304, and S306. By repeating the transfer step until finishing all transfers corresponding to the number of lens elements to be formed, as illustrated in FIG. 10, as many optical elements 404 as the number of repetitions of the transfer step acting on the light curing resin are formed and a lens array 402 is produced.

While the foregoing description illustrates the process of manufacturing the lens array 402 using the first transfer body 102 as the transfer body, it is possible to manufacture a lens array 352 using the second transfer body 122 as the transfer body in the same way as described above.

Figure 12:
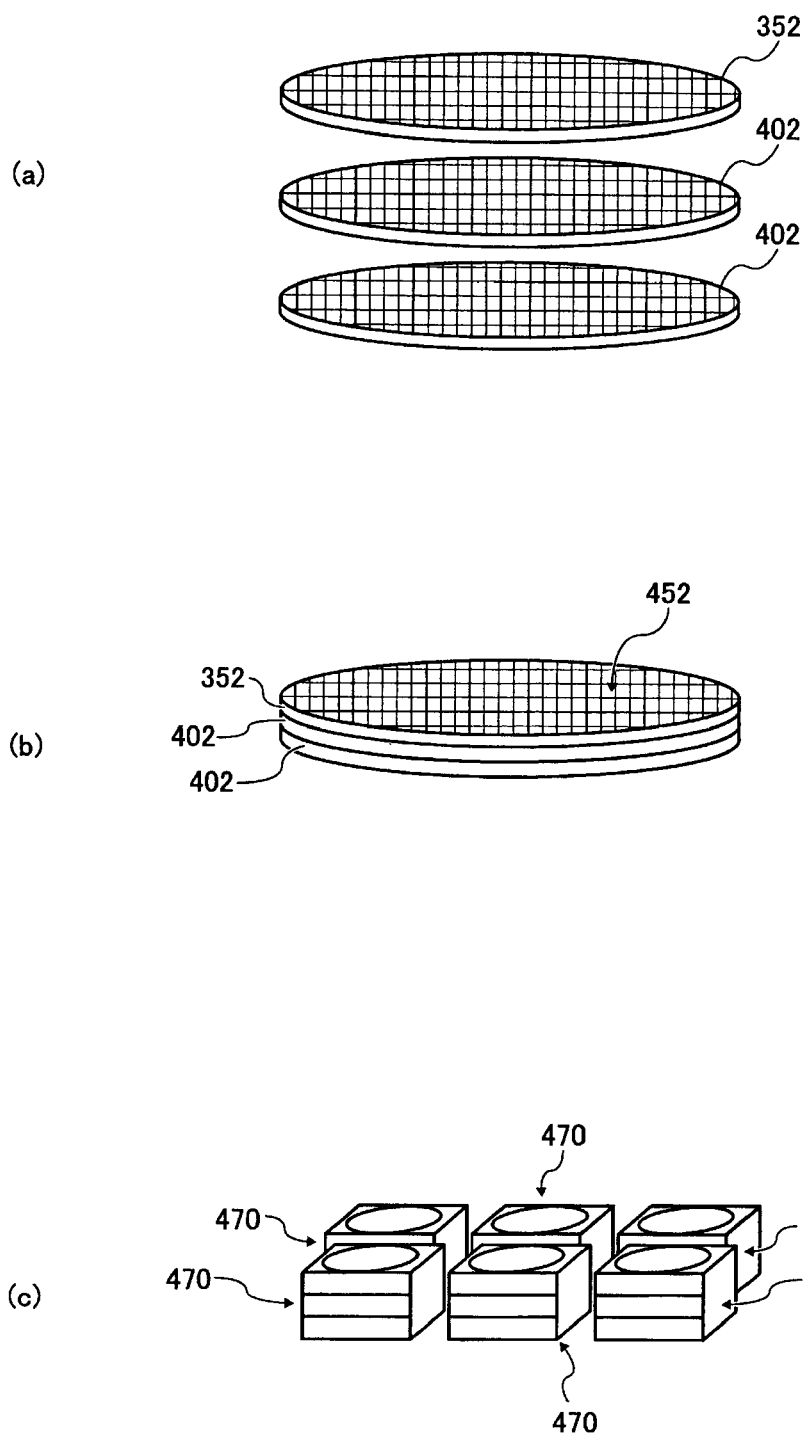
FIGS. 12a-c illustrate the steps of a manufacturing method pertaining to the first embodiment of the present invention.

FIG. 12 illustrates the steps of manufacturing a lens which is an optical part comprising at least one lens element, using the lens array 402 and lens array 352 manufactured through the above-described steps.

First, as is shown in FIG. 12(*a*), for example, two lens arrays 402 and one lens array 352 are prepared, and these three lens arrays are bonded together by a method such as, e.g., bonding one to another (bonding step). FIG. 12(*b*) shows a bonded lens array product 452 in which three lens arrays are bonded together through the bonding step.

Then, the bonded lens array product 452 produced through the bonding step is divided into a plurality of lenses 470 by a method such as, e.g., cutting (dividing step). When dividing the bonded lens array product 452, it is divided so that each of the lens arrays constituting the bonded lens array product 452 comprises at least one optical element. That is, the bonded lens array product 452 is divided so that each of the lens arrays 402 comprises at least one optical element 404 and the lens array 352 comprises at least one optical element 354.

As previously described, the scribe layers S (see FIG. 4), if defined beforehand in each lens array, facilitate dividing the bonded lens array product 452 into pieces.

FIG. 12(*c*) shows lenses 470 produced by dividing the bonded lens array product 452.

While, in the above-described manufacturing process, the foregoing description illustrates the manufacturing process comprising producing a bonded lens array product 452 by bonding a plurality of lens arrays and producing a plurality of lenses 470 by dividing the bonded lens array product 452, single-layer lenses can be produced by dividing a single-layer lens array without bonding a plurality of lens arrays.

Each of the lens arrays 352, 402 can be used as a lens array without dividing it into pieces and the bonded lens array product 452 can be used as a bonded lens array product without dividing it into pieces.

Figure 13:
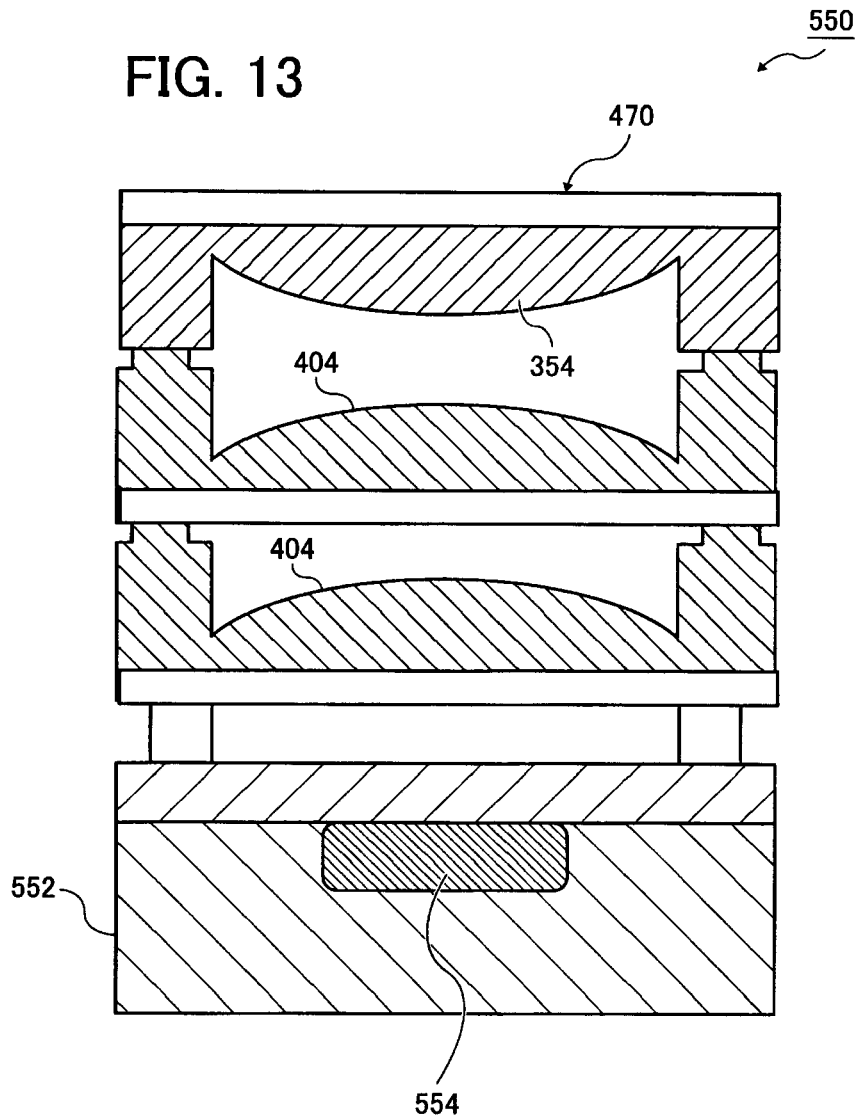
FIG. 13 is a cross-sectional view depicting a camera using a lens manufactured by the bonding apparatus pertaining to the first embodiment of the present invention.

A camera 550 using a lens 470 is shown in FIG. 13.

The camera 550 is manufactured by attaching a light receiving element 552 to the lens 470. The light receiving element 552 comprises, e.g., a CMOS sensor, has a photodiode region 554, and is an element that is used to record an image by converting incident light into an electrical signal. As the light receiving element 552, e.g., a CCD sensor or the like may be used instead of the CMOS sensor.

When light enters the camera 550 from above, the light is refracted by the lens 470 to converge into the photodiode region 554 and the incident light is converted into an electrical signal by the photodiode region 554.

Figure 14:
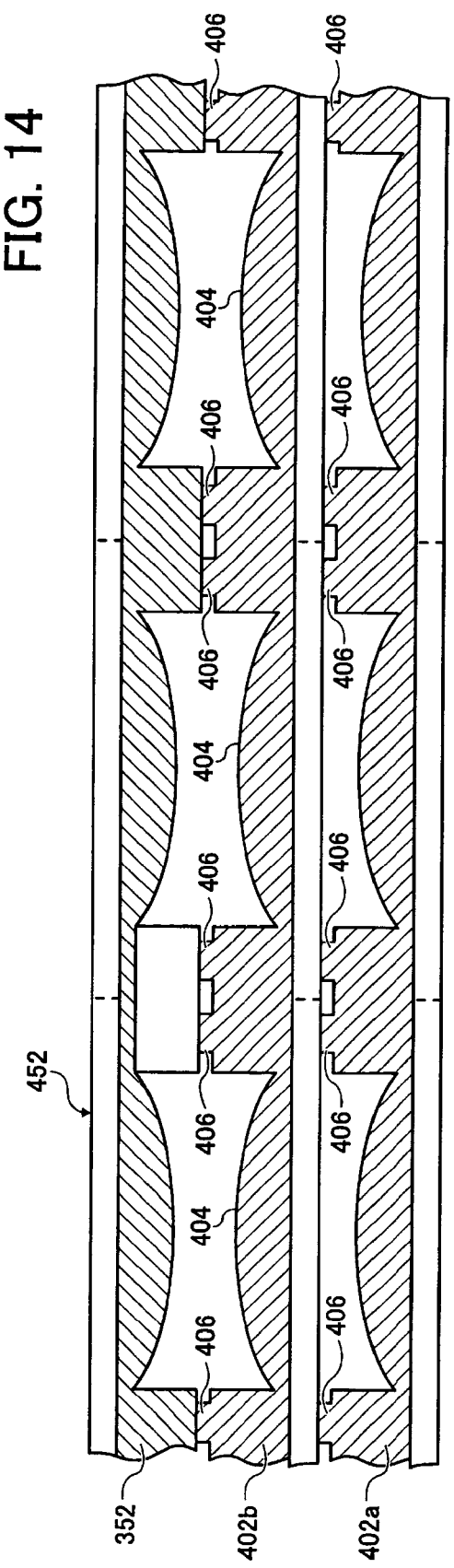
FIG. 14 is a bonded lens array product manufactured by the manufacturing method pertaining to the first embodiment of the present invention.

FIG. 14 depicts a bonded lens array product in which a plurality lens arrays are bonded together.

In particular, FIG. 14 shows a cross-sectional view of the bonded lens array product 452 in which two lens arrays 402 and a lens array 352 are bonded together, shown in FIG. 12(b).

As can be seen in FIG. 14, a lens array 402 (hereinafter labeled a lens array 402a) disposed in the lowest layer has a plurality of projections 406 formed upward and these projections 406 come in contact with the undersurface of a lens array (hereinafter labeled a lens array 402b) disposed on top of the lens array 402a.

More specifically, in the previously described bonding step (see FIGS. 12(a) and 12(b)), the lens array 402a and the lens array 402b are bonded together such that the projections 406 of the lens array 402a come in contact with the lens array 402b.

Likewise, the lens array 402b has projections 406 formed upward and these projections 406 come in contact with the undersurface of the lens array 352. More specifically, in the previously described bonding step, the lens array 402b and the lens array 352 are bonded together such that the projections 406 of the lens array 402b come in contact with the lens array 352.

In this way, because the lens array 402b and the lens array 352 are bonded together such that the projections 406 come in contact with the lens array 352, bonding the lens array 352 and the lens array 402b is accomplished well.

Now, consider a case where the bonding step tries to bond a lens array 352 without projections 406, instead of the lens array 402 shown in FIG. 14, to the lens array 352 from underneath (i.e., the step tries to bond two lens arrays 352 together). In this case, in the interface between the two lens arrays 352, a gap may be formed in a portion where surface-to-surface contact should be achieved in a normal situation and bonding of the lens arrays 352 may not be accomplished well in the portion where the gap is formed. This is due to that it is difficult to press the upper lens array 352 against the lower array 352 by exerting a uniform force on the entire upper lens array 352 and a portion of the upper lens array 352 may not be seated well on the surface of the lower array.

In contrast, in this embodiment, the projections 406 of the lens array 402b contact with the lens array 352. Therefore, for example, three projections 406 arranged around an optical element 404 define a base level for bonding the lens array to the lens array 352, thus reducing the possibility of forming a gap between the lens array 402b and the lens array 352.

Likewise, when bonding lens array 402a and the lens array 402b, the projections 406 formed on the top surface of the lens array 402a contact with the lens array 402b. Thus, there is less possibility of forming a gap between the lens array 402a and the lens array 352b and bonding of the lens array 402a and the lens array 402b is accomplished well.

The projections 406 formed in a lens array 402 enables to accomplish bonding the lens array to another part (bonded part) successfully, as noted above. In addition, the projections can also be used as a basis for position detection; for example, they can be used in aligning the lens array with the bonded part.

Next, a second embodiment of the present invention is described.

The lens arrays 352 and 402 (see FIG. 8) are formed by the molding apparatus 10 (see FIG. 1) in the first embodiment, whereas a mold which is used to mold the lens array 402 and a mold which is used to mold the lens array 352 are manufactured by the molding apparatus 10 in the second embodiment.

As is the case for the first embodiment, each mold is produced through the mounting step S100, the light curing resin application step S200, the transfer step S300, and the wafer carrying out step S500, wherein the transfer step S300 is repeated times corresponding to the number of optical elements (lens elements) to be finally produced in a lens array.

Figure 15:
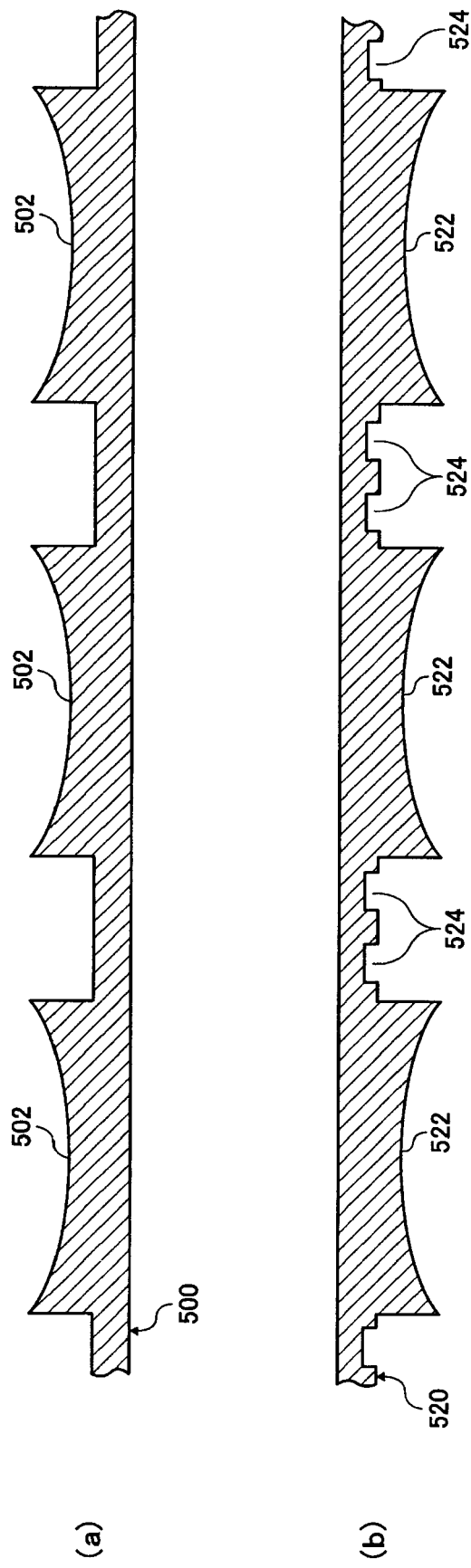

In FIG. 15, molds which are used to manufacture lens arrays are depicted, wherein FIG. 15(a) shows a mold 500 which is used to manufacture the lens array 352 and FIG. 15(b) shows a mold 520 which is used to manufacture the lens array 402.

The mold 520 includes an optical element forming part 522 having a counter profile of an optical element 404 (see FIG. 8) in the lens array 402 and a recess hole 524 having a counter profile of a projection 406 in the lens array 402. The mold 500 includes an optical element forming part 502 having a counter profile of an optical element 354 in the lens array 352.

In FIG. 16, a third transfer body 142 which is used to form the mold 520 is depicted.

In the previously described first embodiment, the first transfer body 102 having the undersurface 126 machined to have a counter profile of an optical element (lens element) 404 to be formed in the lens array 402 is used as the transfer body. In contrast, in the second embodiment, the third transfer body 142 having a part machined into the same shape as the profile of an optical element 404 to be finally formed in the lens array 402 is used.

The third transfer body 142 has a roughly cylindrical body 144 whose undersurface 146 is used as a transfer element. In the undersurface 146, a recess hole 148 shaped into roughly the same shape as the profile of an optical element 404 in the lens array 402 is formed. In the undersurface 146, projections 150 shaped into roughly the same shape as the projections 406 in the lens array 402 are also formed.

The third transfer body 142 is installed in the bearing section 47 of the molding apparatus 10 when it is used.

In FIG. 17, a fourth transfer body 162 which is used to form the mold 500 is depicted. The fourth transfer body 162 has a roughly cylindrical body 164 whose undersurface 166 is used as a transfer surface. In the undersurface 166, a recess hole 168 shaped into roughly the same shape as the profile of an optical element 354 in the lens array 352 is formed.

The fourth transfer body 162 is installed in the bearing section 47 of the molding apparatus 10 when it is used.

FIG. 18 illustrates a process of molding lens arrays 352, 402 using the molds 500, 520 produced by the molding apparatus 10 in the second embodiment of the present invention and a process of manufacturing lenses 470 from the molded lens arrays 352, 402.

In order to manufacture lenses 470 using the molds 500, 520 produced by the molding apparatus 10, as is shown in FIG. 18(a), first, molding a lens array 402 using the mold 520 produced by the molding apparatus 10 is performed by means of, for example, a nanoimprint technique (molding step). More specifically, the mold 520 and a pressing member 530 comprising, e.g., a flat plate are prepared and they are placed such that the side of the mold 520 having the optical element forming parts 522 and the recess holes 524 formed thereon faces the pressing member 530. Using a feeder 220, the material of a lens array such as, e.g., resin is fed into a space between the mold 520 and the pressing member 530.

The molding material such as resin remaining deformed to copy the profile of the mold 520 is hardened, thus manufacturing a lens array 402 having a counter profile of the profile of the transfer surface of the mold 520. In this process, if a light curing resin is used as the material of the lens array 402, the resin can be hardened by light irradiation. Then, a lens array 352 is manufactured using the mold 500 and the pressing member 530 through the same process as for manufacturing the lens array 402.

Formed lens arrays are further processed in the same manner as in the previously described first embodiment. As is shown in FIG. 18(b), for example, two lens arrays 402 and one lens array 352 are bonded together (bonding step) into a bonded lens array product 452 as shown in FIG. 18(c). The bonded lens array product 452 is divided into pieces (dividing step) and lenses are manufactured, as shown in FIG. 18(d).

The lenses thus manufactured can be utilized in the same way as the lenses manufactured in the previously described first embodiment. For example, a camera can be manufactured by attaching a light receiving element such as, e.g., a CMOS sensor to the lens. The thus manufactured camera can be used as, e.g., a camera which is incorporated in a mobile phone.

Moreover, as is the case for the previously described first embodiment, single-layer lenses can be produced by dividing the lens arrays 402, 352 manufactured by the second embodiment separately as a single-layer array without bonding these lens arrays. Further, the bonded lens array product 452 can be used without dividing it into pieces.

One example discussed in the above-described first embodiment is forming a lens array by the molding apparatus 10 and another example discussed in the second embodiment is forming a mold which is used to mold a lens array by the same apparatus. Alternatively, by using the molding apparatus 10, it is also possible to produce molds such as, e.g., an electroforming matrix which is used for electroforming and a model which is immersed in an electrodeposition bath.

INDUSTRIAL APPLICABILITY

As described hereinbefore, the present invention can be applied to an optical part manufacturing method and an optical part manufacturing apparatus which are used to manufacture optical parts such as, for example, lenses, lens arrays, light guide plates for use in a liquid crystal display panel, and a camera equipped with a light receiving element such as a CMOS (Complementary Metal Oxide Semiconductor) sensor as well as a mold manufacturing method and a mold manufacturing apparatus which are used to manufacture molds, for example, a mold which is used to mold optical parts or the like and a mold such as a matrix which is used for electroforming.

The invention claimed is:

1. An optical part manufacturing method comprising:
a deformation step of bringing a molding material and a transfer body having a transfer element including an optical element forming part to form an optical element in the molding material and projection forming parts to form projections in positions apart from a position where the optical element is formed in the molding material during one said deformation step, the deformation step forming the projections extending from the optical part, which come in direct contact with a surface of a bonded part, the surface facing the optical element, the optical element forming part and the projection forming parts being arranged on a planar surface of the transfer element and spaced apart from each other on said surface of the transfer element and defining a profile of the transfer element, and the projection forming parts being generally circular recesses disposed at even intervals around the optical element forming part, and deforming the molding material to copy a counter profile of the profile of the transfer element;
a hardening step of hardening at least a deformed area of the molding material; and
a detaching step of detaching the molding material and the transfer body from each other,
wherein a transfer step of transferring the profile of the transfer element to the molding material is repeated a plurality of times to manufacture an optical part.

2. The optical part manufacturing method according to claim 1, further comprising a dividing step of dividing the optical part into a plurality of optical components, each including at least one optical element.

3. The optical part manufacturing method according to claim 1, further comprising a bonding step of bonding the optical part and a bonded part so that the projections come in contact with the bonded part.

4. The optical part manufacturing method according to claim 3, further comprising a dividing step of dividing a bonded product in which the optical part and the bonded part are bonded together into a plurality of optical components, each including at least one optical element.

5. The optical part manufacturing method according to claim 1, wherein a transfer body having one optical element forming part and at least three projection forming parts formed thereon is used as the transfer body.

6. The optical part manufacturing method according to claim 1,
wherein a molding material made of a light curing material is used, and
wherein the hardening step hardens the molding material by light irradiation.

7. The optical part manufacturing method according to claim 1,
wherein a molding material made of a thermal curing material is used, and
wherein the hardening step hardens the molding material by heating.

* * * * *